3,291,747
METHOD FOR MAKING DOPED YTTRIUM OXIDE PHOSPHORS
Robert A. Lefever, Albuquerque, N. Mex., and Kenneth A. Wickersheim, Menlo Park, Calif., assignors to General Telephone and Electronic Laboratories, Inc., a corporation of Delaware
No Drawing. Continuation of application Ser. No. 213,896, Aug. 1, 1962. This application Mar. 31, 1965, Ser. No. 444,469
4 Claims. (Cl. 252—301.1)

Our invention relates to phosphors and methods for making same.

This application is a continuation of application Serial No. 213,896, filed August 1, 1962, now abandoned.

We have invented a new class of phosphors which, as compared to known phosphors, exhibits significantly enhanced fluorescence when excited by bombardment with electrically charged particles. Accordingly, our invention provides both a new class of phosphors of the character indicated and methods for making the same.

These and other aspects of our invention will either be explained or will become apparent hereinafter.

In accordance with the principles of our invention high purity yttrium oxide after heat treatment is found to exhibit blue-white cathodoluminescence. When desired, a doping ion can be added to the oxide and the same or even enhanced cathodoluminescence will ensue. Typically, the doping ion can be, for example, cadmium, magnesium, copper or thorium.

Illustrative embodiments of our invention will now be described with reference to the specific examples which follow.

*Example I*

2 grams of high purity (99.999 percent pure) yttrium oxide powder were heated to 1300° C. for a period of two hours. This powder was applied as a coating to the inner surface of a screen in a demountable cathode ray tube and was bombarded by an electron beam using a beam current of 5 microamperes and a voltage of 1500 volts between the screen and the electron gun. Bright blue-white cathodoluminescence was observed. When the voltage and current were increased to the maximum available with our equipment, 5000 volts and 20 microamperes respectively, no permanent damage (i.e. "burning") of the screen was observed.

This process was repeated, omitting the heat treatment of the oxide powder, and extremely faint blue-white cathodoluminescence was observed.

The same process was repeated using higher heating temperatures, as for example heating the powder to 2400° C. by passing the powder through an oxy-hydrogen flame. Blue-white cathodoluminescence was observed, the brightness level being considerably higher than that produced by the powder heated to 1300° C.

*Example II*

2 grams of mechanically mixed powders composed of about 1 mole percent of magnesium oxide and 99 mole percent of yttrium oxide were weighed out into a 2000 milliliter beaker. 42 milliliters of commercial grade concentrated nitric acid were added to the beaker. The sample was heated to a temperature falling within the range 80–90° C. for a period of 10–20 minutes until the oxide was dissolved. The solution was then diluted with 500 milliliters of distilled water, and the dilute solution was heated to 80° C.

40 grams of oxalic acid were dissolved in 400 milliliters of distilled water, and the oxalic acid solution was heated to a temperature of 70–80° C. The hot oxalic acid solution as added to the hot dilute solution containing magnesium and yttrium.

During the ensuing reaction, an oxalate precipitate formed and was allowed to settle and cool. The solution was decanted, and the precipitate was washed several times with a 2 percent oxalic acid solution. After filtration with a Büchner funnel using whatman No. 50 (or equivalent) filter paper, the filtrate was placed in a 50 milliliter platinum crucible and was ignited over a burner for about 10 minutes.

The crucible was then loaded into a furnace and ignited at 850° C. for one hour to convert completely the oxalate into an oxide. The resulting cake was ground to powder in a mortar and pestle to produce a phosphor with yttrium oxide as the host material and magnesium (present in an amount equal to 1 mole percent of cation concentration) as the doping ion.

This phosphor was tested in a demountable cathode ray tube as in Example I. Again, blue-white cathodoluminescence was observed, the brightness level being about the same as that at the 1300° C. heated undoped yttrium oxide.

*Example III*

A sample prepared by the process of Example II was heated to 1300° C. for 2 hours. Improved blue-white cathodoluminescence was observed, the brightness level being about the same as that of the 2400° C. heated undoped yttrium oxide.

*Example IV*

The process of Example II was repeated with various doping ions (i.e. cadmium, copper and thorium) to produce the following phosphors: yttrium oxide doped with 1 mole percent of cadmium; yttrium oxide doped with 1 mole percent of copper; and yttrium oxide doped with 1 mole percent of thorium. All of these phosphors, when separately tested in a demountable cathode ray tube in the manner previously indicated, were found to exhibit blue-white cathodoluminescence of a brightness comparable to that obtained in Example II.

Further experiments indicated that as the doping ion concentration was increased appreciably above about 1 mole percent, little improvement in the cathodoluminescence brightness level was observed.

While we have shown and pointed out our invention as applied above, it will be apparent to those skilled in the art that many modifications can be made within the scope and sphere of our invention.

What is claimed is:
1. A process for producing a cathodoluminescent phosphor which comprises the steps of
    (a) preparing a first hot acidic solution containing approximately 99 mole percent yttrium oxide and approximately 1 mole percent of a dopant selected from the group consisting of magnesium, cadmium, copper and thorium,
    (b) reacting said first solution with a second hot solution of oxalic acid,
    (c) allowing the reactants to cool to produce an oxalate precipitate of yttrium and a dopant selected from said group, and
    (d) heating said oxalate precipitate to convert the oxalate to an oxide of yttrium incorporating an element from said group, the resultant phosphor exhibiting a blue-white cathodoluminescence.

2. A process for producing a cathodoluminescent phosphor which comprises the steps of
    (a) heating approximately 99 mole percent yttrium oxide and approximately 1 mole percent of a dopant selected from the group consisting of magnesium, cadmium, copper and thorium with nitric acid to form a first dilute solution having a temperautre of approximately 80° C., (b) preparing a second solution of oxalic acid and heating said solution to a temperature in the range 70°–80° C.,
(c) reacting said first and second solutions to form an oxalate precipitate of yttrium and a dopant selected from said group, and
(d) heating said oxalate precipitate at a temperature in the range 850°–1300° C. for 1 to 2 hours to convert the oxalate to an oxide of yttrium incorporating an element from said group, the resultant phosphor exhibiting a blue-white cathodoluminescence.

3. A process for producing a cathodoluminescent phosphor which comprises the steps of
(a) mixing approximately 99 mole percent yttrium oxide and approximately 1 mole percent magnesium oxide with nitric acid,
(b) heating said mixture to a temperature in the range 80–90° C. until the oxide is dissolved to form a first solution,
(c) preparing a second solution and heating said solution of oxalic acid to a temperature in the range 70–80° C.,
(d) reacting said first and second hot solutions to form an oxalate precipitate of yttrium and magnesium,
(e) allowing said precipitate to settle and cool, and
(f) heating said precipitate to 850° C. for about one hour to convert completely the oxalate into an oxide of yttrium and magnesium, the resultant phosphor exhibiting a blue-white cathodoluminescence.

4. A process for producing a cathodoluminescent phosphor which comprises the steps of
(a) mixing approximately 99 mole percent yttrium oxide and approximately 1 mole percent magnesium oxide with nitric acid,
(b) heating said mixture to a temperature in the range 80–90° C. until the oxide is dissolved to form a first solution,
(c) preparing a second solution and heating said solution of oxalate acid to a temperature in the range 70–80° C.,
(d) reacting said first and second hot solutions to form an oxalate precipitate of yttrium and magnesium,
(e) allowing said precipitate to settle and cool, and
(f) heating said precipitate to 1300° C. for about two hours to convert completely the oxalate into an oxide of yttrium and magnesium, the resultant phosphor exhibiting a blue-white cathodoluminescence.

References Cited by the Examiner

Partington: Textbook of Inorganic Chemistry, Macmillan and Co., Ltd., London, 1950, 6th edition, pages 819–20.

Pascal: Nouveau Traite de Chimie Minerale, Masson and Cie, Paris, 1959, Tome (VII), pages 189–91.

HELEN M. McCARTHY, *Acting Primary Examiner.*

TOBIAS E. LEVOW, *Examiner.*

R. EDMONDS, *Assistant Examiner.*